(12) United States Patent
Hanslip

(10) Patent No.: US 11,098,856 B2
(45) Date of Patent: Aug. 24, 2021

(54) NARROW COLLIMATING AND DIFFUSING OPTIC SYSTEM FOR LED LIGHTING

(71) Applicant: Aion LED, Inc., San Francisco, CA (US)

(72) Inventor: Ryan Hanslip, San Francisco, CA (US)

(73) Assignee: Aion LED, Inc., San Francisco, CA (US)

( * ) Notice: Subject to any disclaimer, the term of this patent is extended or adjusted under 35 U.S.C. 154(b) by 0 days.

(21) Appl. No.: 16/509,173

(22) Filed: Jul. 11, 2019

(65) Prior Publication Data

US 2020/0018448 A1 Jan. 16, 2020

Related U.S. Application Data

(60) Provisional application No. 62/697,645, filed on Jul. 13, 2018.

(51) Int. Cl.
*F21K 9/65* (2016.01)
*G02B 5/02* (2006.01)
*G02B 27/30* (2006.01)

(52) U.S. Cl.
CPC .............. *F21K 9/65* (2016.08); *G02B 5/0205* (2013.01); *G02B 27/30* (2013.01)

(58) Field of Classification Search
CPC .... F21K 9/62–69; G02B 5/0205–0263; G02B 5/0278; G02B 19/00–0066; G02B 27/09–0905; G02B 27/30
USPC ...... 362/217.02–217.04, 223–224, 244–246, 362/249.02, 311.02, 326–340
See application file for complete search history.

(56) References Cited

U.S. PATENT DOCUMENTS

| | | | | |
|---|---|---|---|---|
| 7,390,097 B2 * | 6/2008 | Magarill | ............ | G02B 27/0905 353/38 |
| 8,651,685 B2 * | 2/2014 | Roberts | ............ | G02F 1/133603 362/97.3 |
| 9,081,179 B2 * | 7/2015 | Matsuura | ........... | G02B 27/0101 |
| 9,494,292 B2 * | 11/2016 | Bremerich | .............. | F21V 13/04 |
| 9,732,942 B2 * | 8/2017 | Jorgensen | ............... | F21V 5/007 |

\* cited by examiner

*Primary Examiner* — Jason M Han
(74) *Attorney, Agent, or Firm* — FisherBroyles, LLP; Craig W. Mueller

(57) ABSTRACT

Systems and methods for narrow collimating and diffused lighting, such as narrow collimating and diffused linear LED lighting. In one embodiment, a stacked arrangement including an optical sheet is arranged to receive a light pattern from a LED light to produce a narrower light pattern with diffusion. In one aspect, the optical sheet is a lenticular sheet of microscopic lines.

14 Claims, 4 Drawing Sheets

NARROW COLLIMATING AND DIFFUSING OPTIC SYSTEM FOR LED LIGHTING

CROSS-REFERENCE TO RELATED APPLICATION

This application is a nonprovisional patent application of and claims the benefit of U.S. Provisional Patent Application No. 62/697,645, filed Jul. 13, 2018 and titled "Narrow Collimating Optic for Linear LED with Diffusion," the disclosure of which is hereby incorporated herein by reference in its entirety.

FIELD

The present invention is directed to a system and method for narrow collimating and diffused lighting, such as narrow collimating and diffused linear light emitting diode (LED) lighting.

BACKGROUND

Light emitting diode (LED) lighting has become the standard in architectural design due to better efficiency and increased lifespan compared to previous lighting technologies. Inherent to linear LED lighting is a phenomenon known as pixelation where the visible LED diodes can catch the viewer's eye due to perceived brightness. LED lighting is usually comprised of an array of diodes that are each a point source of light. Pixelation can be a distraction from the design aesthetic and has been characterized by most as undesirable.

Pixelation of LED lighting is commonly mitigated by the use of a diffuser lens. A diffuser is usually comprised of a translucent material like acrylic that utilizes white pigment to cover the point sources and blend the perceived pixels (i.e., dots). Diffusers generally will absorb approximately 25% of the light energy in the process. Consequently, by definition, diffusion will widen the given light beam perpendicular to the beam so as to hide the pixelation and can be counterproductive when attempting to create a narrow beam.

In architectural lighting, there is a need to shape the light beam emitted from a standard 120-degree LED diode to become narrower and to provide farther reach and more "punch." In many cases light shape can mean the difference between displaying a stripe versus an even light wash on a flat surface.

In linear LED lighting, optics and lenses can be integrated into an extruded aluminum housing that doubles as a heat sink for the circuit board electronics.

The effect of making a light beam narrower is known as collimation. Some existing linear optics are designed to narrow light beams but have issues with unsightly yellow colored stripes that appear as artifacts at the most-narrow beam angles. This effect is known as "color over angle." Pigment is often added to the diffuser material to mitigate the yellow stripes or to remove unsightly pixilation. These diffuser modifications will increase the diffusing effect and further widen the beam, which is often not desirable.

Embodiments of the present disclosure provide a narrow beam with diffusion and also mitigate pixelation with a particular secondary optic working in tandem. The secondary optic is an optical sheet comprised of microscopic lines. The lines effectively blend the line of 'dots' or pixels into a visible line of light, while also further collimating the optic and maintaining its performance as a narrow beam. The end result is a narrow collimating and diffusing optical system for LED lighting, the system producing a very narrow beam without yellow stripes or pixelation and minimal energy loss from the lens.

SUMMARY

The present disclosure can provide several advantages depending on the particular aspect, embodiment, and/or configuration.

Generally, a system and method are disclosed for narrow collimating and diffusing lighting, such as narrow collimating and diffusing linear LED lighting.

In one embodiment, a narrow collimating and diffusing optical system for LED lighting is disclosed, the system comprising: at least one LED light that emits LED light at a first light pattern; a collimating optic positioned adjacent the at least one LED light that receives the LED light and alters the first light pattern to emit a collimating optic light of a second light pattern; and an optical sheet positioned adjacent the collimating optic that receives the collimating optic light and emits an optical sheet light; wherein: the optical sheet light is of a third light pattern of reduced pixilation relative to the second light pattern.

In one aspect, the collimating optic is positioned at least partially within the first light pattern. In another aspect, the optical sheet is positioned to receive substantially all of the collimating optic light. In another aspect, the first light pattern generally has a 120-degree profile and the second light pattern generally has a 15 degree profile. In another aspect, the optical sheet is a lenticular sheet comprising a flat first surface and a textured second surface opposite the flat first surface. In another aspect, the textured second surface is a repeated set of convex cross-sectional shapes when viewed along an optical sheet length. In another aspect, the textured second surface faces the collimating optic light. In another aspect, the at least one LED light is a set of LED lights disposed linearly on a substrate; each of the set of LED lights is disposed with a length parallel with a respective substrate length and optically coupled to each of a respective collimating optic and an optical sheet; and each respective optical sheet is positioned with the optical sheet length parallel to the substrate length. In another aspect, the system further comprises a housing that encloses the collimating optic and secures the optical sheet. In another aspect, the housing comprises an extruded aluminum portion.

In another embodiment, a linear LED lighting system to provide a narrow and diffused collimating light is disclosed, the system comprising: a LED light providing a LED light of a first light pattern; a collimating optic providing a collimating optic light of a second pattern, the collimating optic light produced by altering the LED light received from the LED light; and an optic sheet providing an optical sheet light of a third light pattern; wherein: the third light pattern is a collimated light of reduced pixilation relative to the second light pattern.

In one aspect, the first light pattern generally has a 120-degree profile and the second light pattern generally has a 15 degree profile. In another aspect, the optical sheet is lenticular sheet comprising a flat first surface and a textured second surface opposite the flat first surface. In another aspect the textured second surface is a repeated set of convex cross-sectional shapes when viewed along an optical sheet length. In another aspect the textured second surface faces the collimating optic light. In another aspect the repeated set of convex cross-sectional shapes are a repeated set of microscopic convex cross-sectional shapes. In another aspect, the system further comprises a housing that encloses the collimating optic and secures the optical sheet. In another aspect, the at least one LED light is a set of LED lights disposed linearly on a substrate; each of the set of LED lights is disposed with a length parallel with a respective substrate length and optically coupled to each of a respective collimating optic and an optical sheet; and each respective optical sheet is positioned with the optical sheet length parallel to the substrate length.

In yet another embodiment, a linear LED lighting system to provide a narrow collimating diffused light is disclosed, the system comprising: at least one LED light that emits LED light at a first light pattern; a collimating optic stacked above the at least one LED light and receiving the first light pattern and emitting a collimating optic light of a second light pattern; and a lenticular sheet comprising a flat first surface and a textured second surface opposite the flat first surface, the lenticular sheet stacked above the collimating optic and receiving the collimating optic light and emitting a lenticular sheet light; and a controller to control the LED light, the controller configured to receive a dim curve from an external source, the dim curve setting parameters of the first light pattern; wherein: the textured second surface is a repeated set of convex cross-sectional shapes when viewed along an optical sheet length, the textured second surface facing the collimating optic; the first light pattern generally has a 120 degree profile and the second light pattern generally has a 15 degree profile; and the lenticular sheet light is of a third light pattern of reduced pixilation relative to the second light pattern.

In one aspect, the at least one LED light is a set of, LED lights disposed linearly on a substrate; each of the set of LED lights is disposed with a length parallel with a respective substrate length and optically coupled to each of a respective collimating optic and an optical sheet; and each respective optical sheet is positioned with the optical sheet length parallel to the substrate length.

The word "app" or "application" means a software program that runs as or is hosted by a computer, typically on a portable computer, and includes a software program that accesses web-based tools, APIs and/or data.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The disclosed methods may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software, and/or hardware system, such as the hardware and software systems of a communications transceiver.

Various embodiments may also or alternatively be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112, Paragraph 6. Accordingly, a claim incorporating the term "Means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

The disclosure will be readily understood by the following detailed description in conjunction with the accompanying drawings, wherein like reference numerals designate like elements. The elements of the drawings are not necessarily to scale relative to each other. Identical reference numerals have been used, where possible, to designate identical features that are common to the figures.

It should be understood that the proportions and dimensions (either relative or absolute) of the various features and elements (and collections and groupings thereof) and the boundaries, separations, and positional relationships presented there between, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments of systems and methods of use to provide narrow collimating and diffusing optics for LED lighting are provided. Generally, a collimating optic is used in concert with an optical sheet to provide a narrow collimating and diffused light pattern from a traditional LED emitted relatively wide light pattern. In one embodiment, the optical sheet is a lenticular sheet stacked above a collimating optic, the collimating optic itself stacked above an LED light.

Various embodiments of the narrow collimating and diffusing optical system for LED lighting, also referenced as the "system", and various embodiments of methods of use of the system for providing narrow collimating and diffusing optics for LED lighting, also referenced as the "method", will now be described with respect to FIGS. 1-6.

Figure 1C:
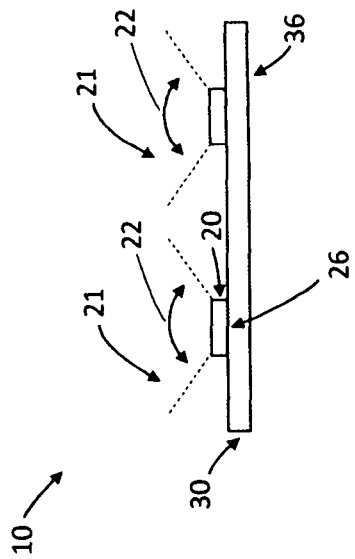
FIG. 1C shows a side view of the linear LED lighting system of FIG. 1A.
Figure 1B:
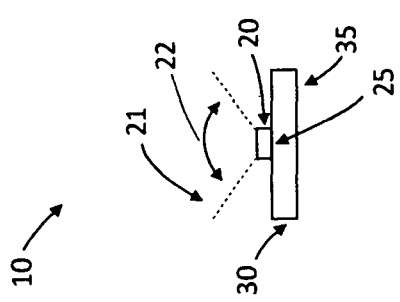
FIG. 1B shows an end view of the linear LED lighting system of FIG. 1A.
Figure 1A:
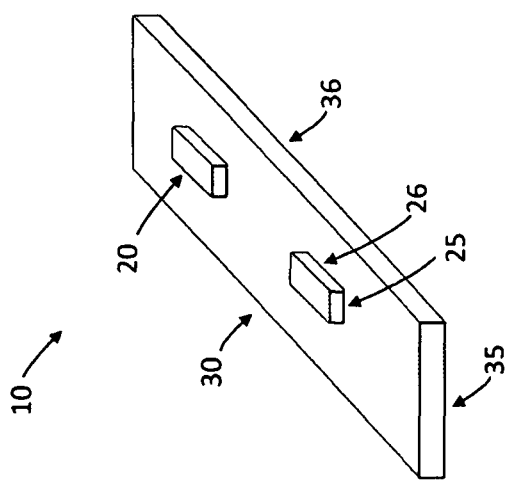
FIG. 1A shows a perspective view of a linear LED lighting system of the prior art.

With particular attention to FIGS. 1A-C, a conventional arrangement of a set or array of LED lights is provided. Such an arrangement or array of LEDs in a line array along a strip or elongated fixture is commonly termed a linear LED system 10. Linear LED systems have many uses, to include uses' which require long, seamless linear lighting fixtures that may be visible in plain sight, for example as used in architectural lighting applications.

Each LED light 20 of the linear LED system 10 comprises a LED width 25 and a LED length 26. Each LED light 20 is disposed or mounted to a substrate 30, which may be an aluminum substrate. The substrate comprises a substrate width 35 and a substrate length 36. The LED width 25 is generally parallel with the substrate width 35. The LED width 25 is generally perpendicular with the substrate length 36. The LED length 26 is generally parallel with the substrate length 36. The LED length 2'6 is generally perpendicular with the substrate width 35.

Each LED light 20 emits a LED light pattern 21 with a LED light profile 22. The phrase "light pattern" refers to all characteristics of an emitted light, such as brightness, profile angle, color, pixilation, etc. The phrase "light profile" refers to the angle of the emitted cone of light; light profile is one characteristic of a light pattern. When viewed in cross-section (FIGS. 1B, 1C), the LED 20 emits a LED light pattern 21 with a LED light profile 22 of approximately 120 degrees.

Figure 2:
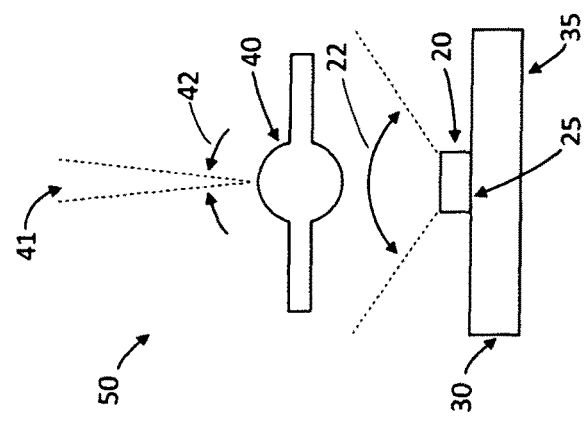
FIG. 2 shows a side view of a LED lighting system with collimating optic of the prior art.

FIG. 2 shows a side view of a LED lighting system 50 with collimating optic 40 of the prior art. The LED lighting system 50 is similar to the LED system 10 of FIGS. 1A-C, except that only one LED is depicted and a collimating optic 40 has been added. As discussed above, a collimating optic 40 generally narrows a received light beam. Stated another way, the collimating optic 50 receives light of a first profile and narrows the first profile to a second profile, the second profile less than the first profile.

More specifically, the LED 20; mounted on a substrate 30, emits a LED light pattern 21 with LED light profile 22 which is received by collimating optic 40. The collimating optic alters or changes the LED light pattern 21 with LED light profile 22 to produce a collimating optic light pattern 41 with a collimating optic light profile 42, the collimating optic light profile 42 narrower (that is, of a reduced angle) than the LED light profile 22. However, the collimating optic light pattern 41 traditionally has one or more undesirable characteristics, as discussed above. For example, the collimating optic light pattern 41 may exhibit the "color over angle" of unsightly yellow colored stripes at the most-narrow beam angles, a characteristic not found in the incoming or received LED light pattern 21. Additionally, or alternatively, the collimating optic light pattern 41 may exhibit the pixilation effect discussed above.

Figure 3:
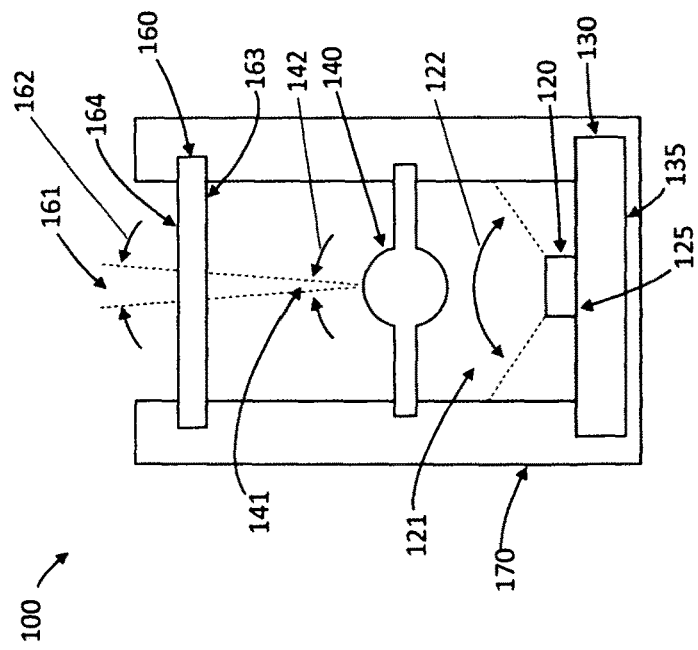
FIG. 3 shows a side view of one embodiment of the narrow collimating and diffusing optical system for LED lighting.

With attention to FIG. 3, a side view of one embodiment of the narrow collimating and diffusing optical system for LED lighting (the "system") 100 is provided. Although only one system 100 is depicted, a set or array of systems 100 may be arranged to create a linear LED array similar to that depicted in FIGS. 1A-C, except with the additional features depicted in FIG. 3.

Generally, the narrow collimating and diffusing optical system for LED lighting 100 adds a second optic (in addition to the first optic—the collimating optic) to mitigate if not remove the undesirable pixilation effect created by the collimating optic. More specifically, an optical sheet (such as a lenticular sheet), is stacked to receive (at least some of) the light emitted from the collimating optic. The optical sheet has a textured surface (for example, a ridged surface) and an opposite smooth or flat surface. In one embodiment, the smooth surface faces the collimating optic such that light passing through the optical sheet substantially maintains its characteristic narrowness yet removes the pixelation effect. The textured and/or ridged surface of the lenticular sheet modifies the narrow light beam to remove the pixelation effect. In another embodiment, the textured or ridged surface faces the collimating optic such that light passing through the optical sheet substantially maintains its character narrowness character yet removes the pixelation effect.

Returning to FIG. 3, the narrow collimating and diffusing optical system for LED lighting 100 comprises a LED light 120 with LED light width 125 and LED length (similar to that of FIGS. 1A-C). The LED light 120 is coupled to a substrate 130, the substrate with substrate width. 135 and substrate length (similar to that of FIGS. 1A-C). In one embodiment, the LED light 120 is disposed on the substrate 130. The LED light width 125 is generally parallel with the substrate width 135. The LED width 125 is generally perpendicular with the substrate length. The LED length is generally parallel with the substrate length. The LED length is generally perpendicular with the substrate width 135.

In one embodiment, the arrangement of LED light 120 and substrate 130 and/or the system 100 includes heat sink features, such as described in U.S. Pat. No. 9,797,583 entitled "LED LIGHTING WITH FRANGIBLE CIRCUIT BOARD AND HEAT SINK MOUNT" and/or U.S. Pat. Appl. No. 62/868,424 entitled "MODULAR ENCAPSULATED LED LIGHTING WITH INTEGRATED HEAT SINK," both of which are incorporated by reference in entirety for all purposes.

In one embodiment, the arrangement of LED light 120 and substrate 130 and/or the system 100 includes heat sink and/or encapsulated features, such as described in U.S. Pat. Appl. No. 62/868,424 entitled "MODULAR ENCAPSULATED LED LIGHTING WITH INTEGRATED HEAT SINK." In one embodiment, the substrate 130 is an aluminum substrate.

The LED light 120 emits a LED light pattern 121' with LED light profile 122. The LED light profile 122 may form a LED cone of light that is symmetrical about a vertical axis to the LED light. The LED cone of light may create a LED light profile of 120 degrees when viewed from every side angle. In some embodiments, the LED light profile 122 is of any angle known to those skilled in the art and/or produced by LED lights in commercial use.

The LED light pattern 121 with LED light profile 122 is received by the collimating optic 140. The collimating optic 140 is positioned to receive at least some of the LED light pattern 121. In one embodiment, the collimating optic 140 is positioned to receive substantially all of the LED light pattern 121. In one embodiment, the collimating optic 140 is positioned to receive all of the LED light pattern 121. The collimating optic 140 receives the LED light pattern 121 and alters or changes the LED light pattern 121 to produce or emit a collimating optic light pattern 141 with collimating optic light profile 142. The collimating optic light profile 142 may form a collimating optic light cone that is symmetrical about a vertical axis to the collimating optic light. The collimating optic light cone may create a collimating optic light profile 142 of 15 degrees when viewed from any side angle. In some embodiments, the collimating optic light profile 142 is of every angle known to those skilled in the art and/or produced by collimating optics in commercial use.

The collimating optic 140 may be any collimating optical device or lens in commercial use, to include the generally spherically shaped collimating optic depicted in FIG. 3.

The collimating optic 140 is mounted or secured or coupled to a housing 170. The housing 170 may also secure or couple to the optical sheet 160. In one embodiment, at least a portion of the interior of the housing 170, such as the interior housing portion defined by the region between the collimating optic 140 and the LED 120, is of a reflective material so as to reflect the LED light pattern 121.

The collimating optic light pattern 141 with collimating optic light profile 142 is received by the optical sheet 160. The optical sheet 160 is positioned to receive at least some of the collimating optic light pattern 141. In one embodiment, the optical sheet 160 is positioned to receive substantially all of the collimating optic light pattern 141. In one embodiment, the optical sheet 160 is positioned to receive all of the collimating optic light pattern 141. The optical sheet 160 receives the collimating optic light pattern 141 and alters or changes the collimating optic light pattern 141 to produce or emit an optical sheet light pattern 161 with optical sheet light profile 162. The optical sheet light profile 162 may form an optical sheet light cone that is symmetrical about a vertical axis to the optical sheet light. The optical sheet light cone may create an optical sheet light profile 162 of 15 degrees when viewed from every side angle. In some embodiments, the optical sheet light profile 162 is of any angle known to those skilled in the art and/or produced by optical sheet light optics used in commercial use. The optical sheet light 160 may be any optical sheet light device or lens in commercial use, to include the lenticular optical sheet depicted in FIG. 4.

Figure 4:
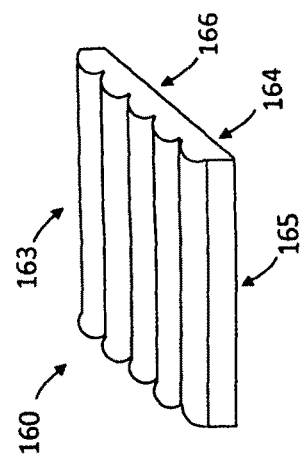
FIG. 4 shows a detail perspective view of one embodiment of the optical sheet element of the embodiment of the narrow collimating and diffusing optical system for LED lighting of FIG. 3.

With attention to FIGS. 3 and 4, the optical sheet 160 comprises a flat first surface 164 and a textured (or ridged) second surface 163, and an optical sheet width 165 and optical sheet length 166. The flat first surface 164 is opposite the textured second surface 163. In one embodiment, the textured second surface 163 is a repeated set of convex cross-sectional shapes when viewed along an optical sheet length 166. The textured second surface 163 faces the collimating optic 140 and associated collimating optic light pattern 141.

In one embodiment, the flat first surface 164 faces the collimating optic 140 and associated collimating optic light pattern 141. In one embodiment, the textured second surface 163 is comprised of a repeating set of microscopic lines that run perpendicular to the line of LEDs in a given linear LED array. In one embodiment, the textured second surface 163 is comprised of a repeating set of microscopic lines that run parallel to the line of LEDs in a given linear LED array. In one embodiment, the textured second surface 163 is comprised of a set of microscopic lines or ridges, a set of microscopic features, or any features that will function to reduce or minimize pixilation while maintaining optical beam width or optical beam profile.

Figure 5:
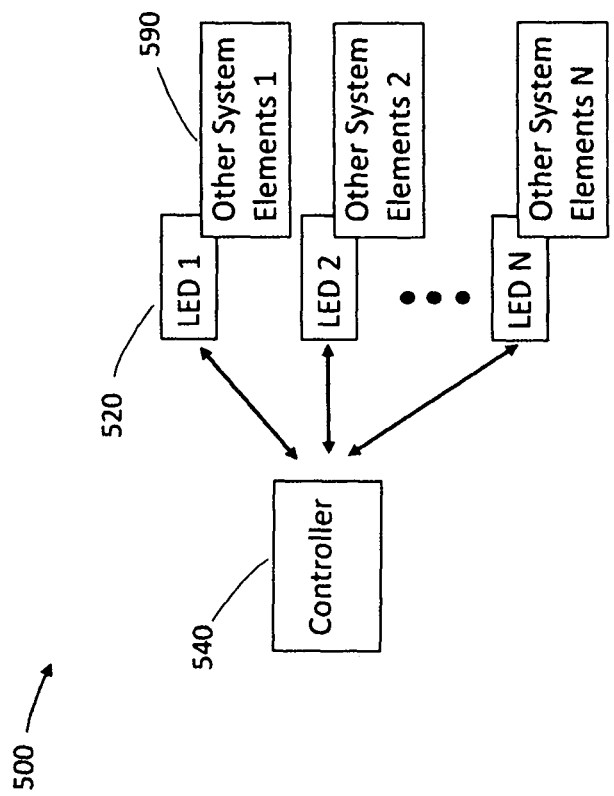
FIG. 5 shows a schematic view of a narrow collimating and diffusing optical system for LED lighting of FIG. 3 as part of a larger controller-managed lighting system.

With attention to FIG. 5, the narrow collimating and diffusing optical system for LED lighting 100 of FIG. 3 may form a set or array of LEDs 520 that may be controlled by a controller 540. The set or array of LEDs 520 may be disposed linearly on a substrate, as depicted in FIG. 1A. Such a narrow collimating and diffusing optical system for arrayed LED lighting 500 comprises a set or array of LEDs 520 coupled with the other system elements 590 described with respect to the narrow collimating and diffusing optical system for. LED lighting 100 of FIG. 3, e.g. to include a respective collimating optic, optical sheet, etc.

In one embodiment, each respective optical sheet is positioned with the optical sheet length parallel to the substrate length. In one embodiment, each respective optical sheet is positioned with the optical sheet length perpendicular to the substrate length.

In one embodiment, the controller is an app, and/or the controller interacts with an app.

In one embodiment; control and/or features of the narrow collimating and diffusing optical system for arrayed LED lighting 500 is as described in U.S. Pat. No. 10,111,294 entitled "EFFICIENT DYNAMIC LIGHT MIXING FOR COMPACT LINEAR LED ARRAYS" and/or U.S. patent application Ser. No. 16/159,404 entitled "FIELD-CONFIGURABLE LED TAPE LIGHT," both of which are incorporated by reference in entirety for all purposes.

Figure 6:
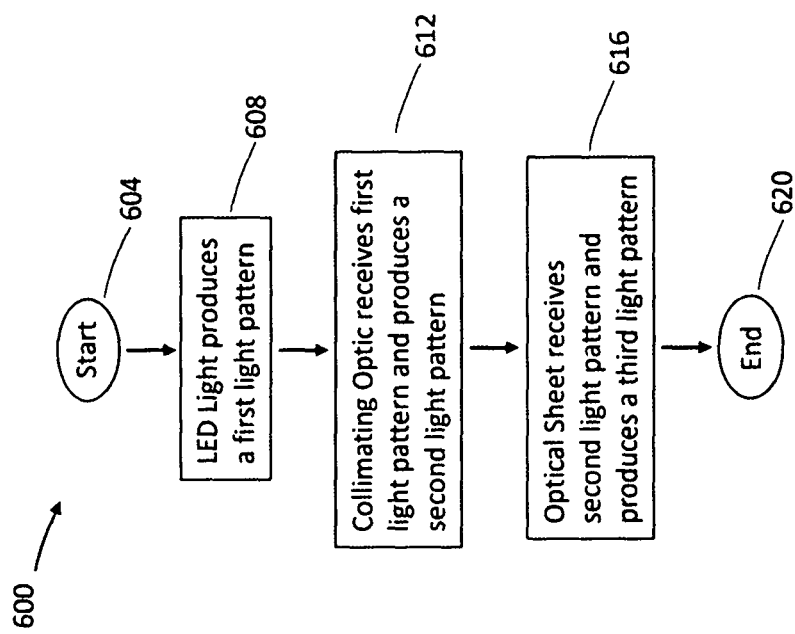
FIG. 6 is a flow chart of a method of use of the narrow collimating and diffusing optical system for LED lighting of FIG. 3.

FIG. 6 is a flow chart of a method of use 600 of the narrow collimating and diffusing optical system for LED lighting of FIG. 3. The method of use 600 will be described with reference to elements of the previous FIGS. 1-5. Generally, FIG. 6 provides a method use of the narrow collimating and diffusing optical system for LED lighting, such as the narrow collimating and diffusing optical system for LED lighting 100 of FIG. 3. The method of FIG. 6 does not imply any limitation in the systems and methods of the disclosure.

With attention to FIG. 6, a method of use 600 of a narrow collimating and diffusing optical system for LED lighting is provided. The flowchart or process diagram of FIG. 6 starts at step 604 and ends at step 620. Any of the steps, functions, and operations discussed herein can be performed continuously and automatically. The steps are notionally followed in increasing numerical sequence, although, in some embodiments, some steps may be omitted, some steps added, and the steps may follow other than increasing numerical order.

After beginning at step 604, the method 600 proceeds to step 608, where an LED light emits a LED light, the LED light of a first pattern comprising a first light profile. The first light profile may be of approximately 120 degrees. After completing step 608, the method 600 continues to step 612.

At step 612, the collimating optic receives the first light pattern from the LED light. The collimating optic changes or alters the first light pattern to produce a second light pattern with a second light profile. The second light profile may be approximately 15 degrees. The second light profile may comprise increased pixilation from the first light profile and/or "color over angle." After completing step 612, the method 600 continues to step 616.

At step 616, the optical sheet receives the second light pattern from the collimating optic. The optical sheet changes or alters the second light pattern to produce a third light pattern with a third light profile. The third light profile may be approximately 15 degrees and/or substantially the same profile or light width as the second light profile. The third light pattern is of reduced pixilation relative to the second light profile. Alternatively, or additionally, the third light pattern may be of substantially the same pixilation as the first light pattern. In one embodiment, the optical sheet mitigates or removes any "color over angle" or similar artifacts produced by the collimating optic. In one embodiment, the optical sheet is a lenticular sheet with a flat first side and an opposite textured second side or ridged second side. The textured second side may be of a set of microscopic hemispherical shapes with hemispherical top forming the apex or highest point on the textured second side. Stated another way, a set of half-circles (in cross-section) may be formed on the textured second side. After completing step 616, the method 600 ends at, step 620.

What is claimed is:

1. A narrow collimating and diffusing optical system for LED lighting, the system comprising:
   at least one LED light that emits LED light at a first light pattern;
   a collimating optic positioned above the at least one LED light that receives and alters the first light pattern to emit a collimating optic light of a second light pattern;
   an optical sheet comprising a flat first surface and a textured second surface opposite the flat first surface, the optical sheet positioned above the collimating optic that receives the collimating optic light and emits a optical sheet light;
   a controller configured to receive a dim curve from an external source that sets parameters of the first light pattern;
   wherein the textured second surface is a repeated set of convex cross-sectional shapes when viewed along an optical sheet length, the textured second surface facing the collimating optic;
   wherein the first light pattern generally has a 120 degree profile and the second light pattern forms an optic light cone with generally a 15 degree profile; and
   wherein the optical sheet light is of a reduced pixilation relative to the second light pattern.

2. The system of claim 1, wherein the collimating optic is positioned at least partially within the first light pattern.

3. The system of claim 1, wherein the optical sheet is positioned to receive substantially all of the collimating optic light.

4. The system of claim 1, wherein the optical sheet is a lenticular sheet comprising the flat first surface and the textured second surface.

5. The system of claim 1, further comprising an interior housing portion enclosing the colliminating optic and having a reflective material reflecting the LED light.

6. The system of claim 1, further comprising a housing that encloses the collimating optic and secures the optical sheet.

7. The system of claim 6, wherein the housing comprises an extruded aluminum portion.

8. A linear LED lighting system to provide a narrow and diffused collimating light comprising:
   a LED light providing a LED light of a first light pattern;
   a collimating optic providing a collimating optic light of a second pattern, the collimating optic light produced by altering the LED light received from the LED light; and
   an optic sheet comprising a flat first surface and a textured second surface opposite the flat first surface, the optical sheet positioned above the collimating optic that receives the collimating optic light and emits a optical sheet light;
   a controller configured to receive a dim curve from an external source that sets parameters of the first light pattern;
   wherein the textured second surface is a repeated set of convex cross-sectional shapes when viewed along an optical sheet length, the textured second surface facing the collimating optic;
   wherein the first light pattern generally has a 120 degree profile and the second light pattern forms an optic light cone with generally a 15 degree profile; and
   wherein the optical sheet light is of a reduced pixilation relative to the second light pattern.

9. The system of claim 8, wherein the optical sheet is lenticular sheet comprising the flat first surface and the textured second surface.

10. The system of claim 8, wherein the repeated set of convex cross-sectional shapes are a repeated set of microscopic convex cross-sectional shapes.

11. The system of claim 8, further comprising a housing that encloses the collimating optic and secures the optical sheet.

12. The system of claim 8, further comprising an interior housing portion enclosing the collimating optic and having a reflective material reflecting the LED light.

13. A linear LED lighting system to provide a narrow collimating diffused light comprising:
   at least one LED light that emits LED light at a first light pattern;
   a collimating optic stacked above the at least one LED light and receiving the first light pattern and emitting a collimating optic light of a second light pattern; and
   a lenticular sheet comprising a flat first surface and a textured second surface opposite the flat first surface, the lenticular sheet stacked above the collimating optic and receiving the collimating optic light and emitting a lenticular sheet light; and a controller to control the LED light, the controller configured to receive a dim curve from an external source, the dim curve setting parameters of the first light pattern;

wherein:

the textured second surface is a repeated set of convex cross-sectional shapes when viewed along an optical sheet length, the textured second surface facing the collimating optic;

the first light pattern generally has a 120 degree profile and the second light pattern forms an optic light cone with generally a 15 degree profile; and the lenticular sheet light is of a third light pattern of reduced pixilation relative to the second light pattern.

14. The system of claim 13, further comprising an interior housing portion enclosing the collimating optic having a reflective material reflecting the LED light.

\* \* \* \* \*